(12) United States Patent
Touzet et al.

(10) Patent No.: US 11,597,302 B2
(45) Date of Patent: Mar. 7, 2023

(54) METHOD OF FIXING BY WELDING AN INTERFACE SUPPORT ON A PROFILE OF A VEHICLE SEAT SLIDE

(71) Applicant: FAURECIA Sièges d'Automobile, Nanterre (FR)

(72) Inventors: Bertrand Touzet, Pollhagen (DE); Gérald Garotte, Bellou en Houlme (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/344,148

(22) Filed: Jun. 10, 2021

(65) Prior Publication Data

US 2021/0387551 A1  Dec. 16, 2021

(30) Foreign Application Priority Data

Jun. 11, 2020 (FR) ..................... 20 06109

(51) Int. Cl.
*B60N 2/07* (2006.01)
*B23K 26/21* (2014.01)

(52) U.S. Cl.
CPC ............ *B60N 2/0715* (2013.01); *B23K 26/21* (2015.10); *B60N 2/0732* (2013.01)

(58) Field of Classification Search
CPC .... B60N 2/0705; B60N 2/0715; B60N 2/073; B60N 2/682; B60N 2/0818; B60N 2/0732; B23K 26/035
See application file for complete search history.

(56) References Cited

U.S. PATENT DOCUMENTS

| 8,187,721 | B2 | 5/2012 | Geisler et al. | |
| 11,214,175 | B2 * | 1/2022 | Couasnon | B60N 2/0722 |
| 2016/0144746 | A1 * | 5/2016 | Couasnon | B60N 2/0732 384/34 |
| 2018/0339611 | A1 * | 11/2018 | Matsui | B60N 2/0732 |
| 2020/0139856 | A1 * | 5/2020 | Ioppolo | B60N 2/0732 |

FOREIGN PATENT DOCUMENTS

| DE | 102010042285 A1 | 4/2012 |
| EP | 2586648 A1 | 5/2013 |
| FR | 2880307 A1 | 7/2006 |
| JP | 2011251299 A | 12/2011 |
| WO | 2006040276 A1 | 4/2006 |

OTHER PUBLICATIONS

French Search Report for French App. No. FR2006109 dated Feb. 8, 2021, B2020457 FR, 23 pages, No English translation available.

\* cited by examiner

*Primary Examiner* — Sarah B McPartlin
(74) *Attorney, Agent, or Firm* — Barnes & Thornburg LLP

(57) ABSTRACT

A method of welding a support on a slide profile, which comprises: a) providing a support having a wall with an inner face, and providing a profile having a wall with an outer face, b) positioning the interface support with the inner face of its wall against the outer face of the wall of the profile, c) creating a welding joint between the wall of the support and the wall of the profile by moving a laser beam relative to the wall of the profile, while keeping the laser beam in a position such that it successively passes through, from an emitting source: the wall of the profile, then the wall of the support, while remaining within the material of the wall of the support.

13 Claims, 10 Drawing Sheets

METHOD OF FIXING BY WELDING AN INTERFACE SUPPORT ON A PROFILE OF A VEHICLE SEAT SLIDE

PRIORITY CLAIM

This application claims priority to French Patent Application No. FR 20 06109, filed Jun. 11, 2020, which is expressly incorporated by reference herein.

BACKGROUND

The present disclosure relates to a method of fixing, by welding, an interface support on a profile of a vehicle seat slide and a profile of a vehicle seat slide obtainable by such a method.

SUMMARY

According to the present disclosure, a method of fixing, by welding, an interface support on a profile of a vehicle seat slide without impeding the mobility of an element mounted on the interface support is disclosed.

In illustrative embodiments, providing such a method of fixing by welding that ensures a strong attachment of the interface support to the slide profile, and in particular in the event of an impact undergone by the vehicle receiving the slide.

In illustrative embodiments, providing such a method of fixing by welding which allows improving the aesthetics of the slide profile obtained.

In illustrative embodiments, providing such a method of fixing by welding which is simple to perform, and in particular in a fully automated and simplified manner, without using a robot, that is fast and at a reduced production cost.

In illustrative embodiments, a method of fixing, by welding, an interface support to a profile of a vehicle seat slide rail is proposed, comprising the steps of:

providing an interface support having at least one wall with an inner face, and providing a slide rail profile having a substantially U-shaped cross-section with a transverse wall interconnecting two side walls, the side walls being substantially parallel to each other and the transverse wall being substantially perpendicular to the side walls, the transverse wall and each side wall having an inner face and an outer face, positioning the interface support with the inner face of its at least one wall against the outer face of a wall of the profile, creating a welding joint between the wall of the interface support and the wall of the profile by moving a laser beam, emitted from an emitting source, relative to the wall of the profile, while keeping the laser beam in a position such that it successively passes through, and in this order from the emitting source: the inner face of the wall of the profile, then the outer face of the wall of the profile, then the inner face of the wall of the interface support, and while remaining within the material of the wall of the interface support.

In illustrative embodiments, the thickness of the wall of the interface support is greater than the thickness of the wall of the profile.

In illustrative embodiments, the profile is an upper slide rail profile, and the interface support has a first stop wall, the inner face of the first stop wall being provided to come into contact with the outer face of a side wall of the profile during step b) of the method, a welding joint being created at the end of step d) between the first stop wall of the interface support and the side wall of the profile.

In illustrative embodiments, the interface support has a second stop wall, the inner face of the second stop wall being provided to come into contact with the outer face of the transverse wall of the profile during step b) of the method, a welding joint being created at the end of step c) between the second stop wall of the interface support and the transverse wall of the profile.

In illustrative embodiments, the method further comprises, following step b) and prior to step c), a step b') of positioning the laser beam emitted from the emitting source so that it passes successively through, and in this order from the emitting source: the inner face of the wall of the profile, then the outer face of the wall of the profile, then the inner face of the wall of the interface support, and while remaining within the material of the wall of the interface support.

In illustrative embodiments, the interface support is configured to receive a connection means for connecting a vehicle seat frame to the profile.

In illustrative embodiments, a profile of a vehicle seat slide, having a substantially U-shaped cross-section with a transverse wall interconnecting two side walls, the side walls being substantially parallel to each other and the transverse wall being substantially perpendicular to the side walls, the transverse wall and each side wall having an inner face and an outer face, the slide profile comprising an interface support fixed by welding to the outer face of one of its walls, the profile being capable of being obtained by the method according to one of the embodiments of the present disclosure.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1A schematically represents a front view of step a) of the method according to one embodiment of the present disclosure;

FIG. 1B schematically represents a perspective view of step a) of FIG. 1A;

FIG. 2A schematically represents a front view of step b) of the method according to one embodiment of the present disclosure;

FIG. 2B schematically represents a perspective view of step b) of FIG. 2A;

FIG. 3 schematically represents a front view of step b') of the method according to one embodiment of the present disclosure;

FIG. 4 schematically represents a perspective view of step c) of the method according to one embodiment of the present disclosure;

DETAILED DESCRIPTION

Figure 1A:
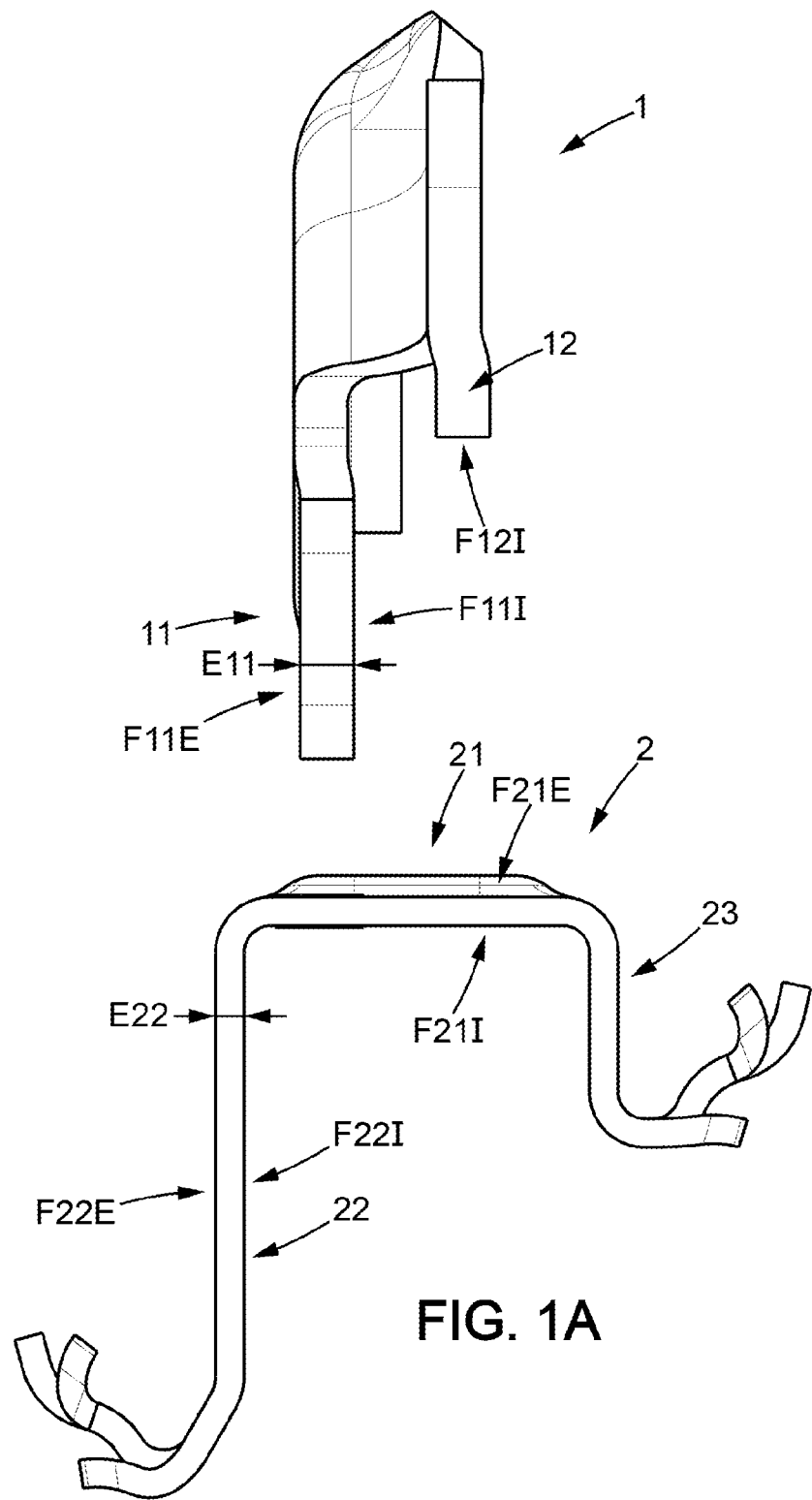

The drawings and description below contain, for the most part, elements that are certain in nature. Therefore not only can they serve to provide a better understanding of the present disclosure, but they also contribute to its definition, where appropriate.

Similarly, substantially parallel or perpendicular is understood to mean an orientation relative to a given element forming an angle less than 30°, which advantageously can be zero, along a line parallel, respectively perpendicular, to this element.

The present disclosure relates to a method for fixing, by welding, an interface support 1 to a profile 2 of a vehicle seat slide, comprising the steps of:

a) providing an interface support 1 having at least one wall 11, 12 with an inner face F11I, F12I, and providing a slide rail profile 2 having a substantially U-shaped cross-section with a transverse wall 21 interconnecting two side walls 22, 23, the side walls 22, 23 being substantially parallel to each other and the transverse wall 21 being substantially perpendicular to the side walls 22, 23, the transverse wall 21 and each side wall 22, 23 having an inner face F21I, F22I and an outer face F21E, F22E, b) positioning the interface support 1 with the inner face F11I, F12I of its at least one wall 11, 12 against the outer face F21E, F22E of a wall 21, 22 of the profile 2, c) creating a welding joint 5 between the interface support 1 and the wall 21, 22 of the profile 2 by moving a laser beam 3, emitted from an emitting source 4, relative to the wall 21, 22 of the profile 2, while keeping the laser beam 3 in a position such that it successively passes through, and in this order: the inner face F21I, F22I of the wall 21, 22 of the profile 2, then the outer face F21E, F22E of the wall 22 of the profile, then the inner face F11I, F12I of the wall 11, 12 of the interface support 1, and while remaining within the material of the wall 11, 12 of the interface support 1.

Figure 1B:
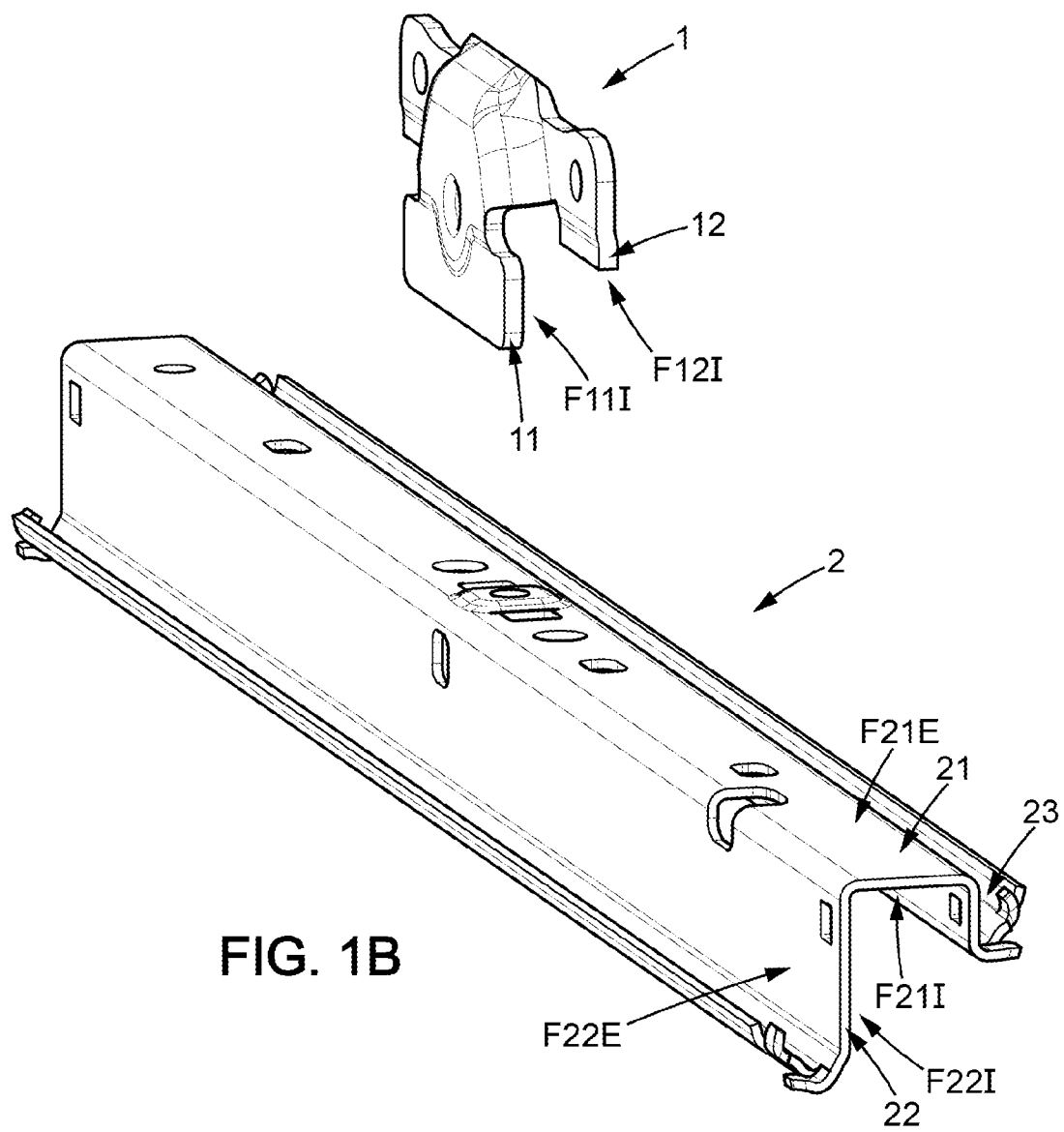
Figure 2A:
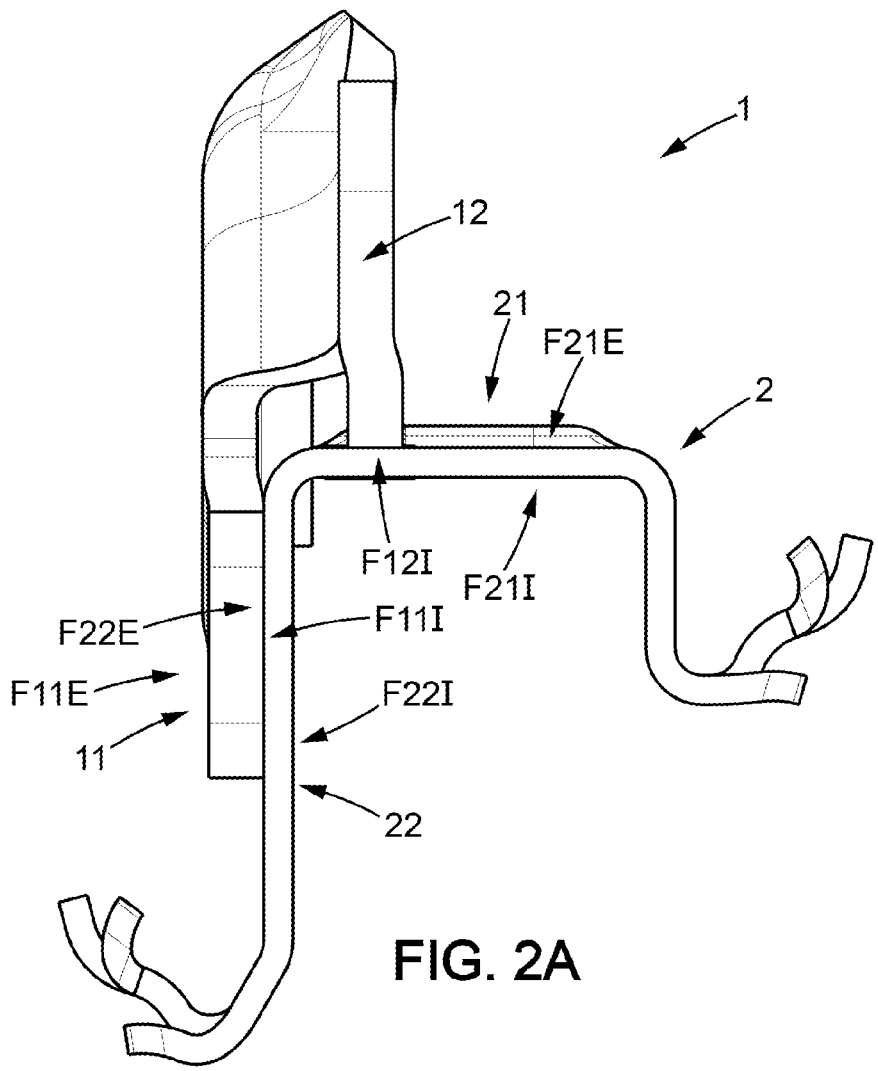
Figure 2B:
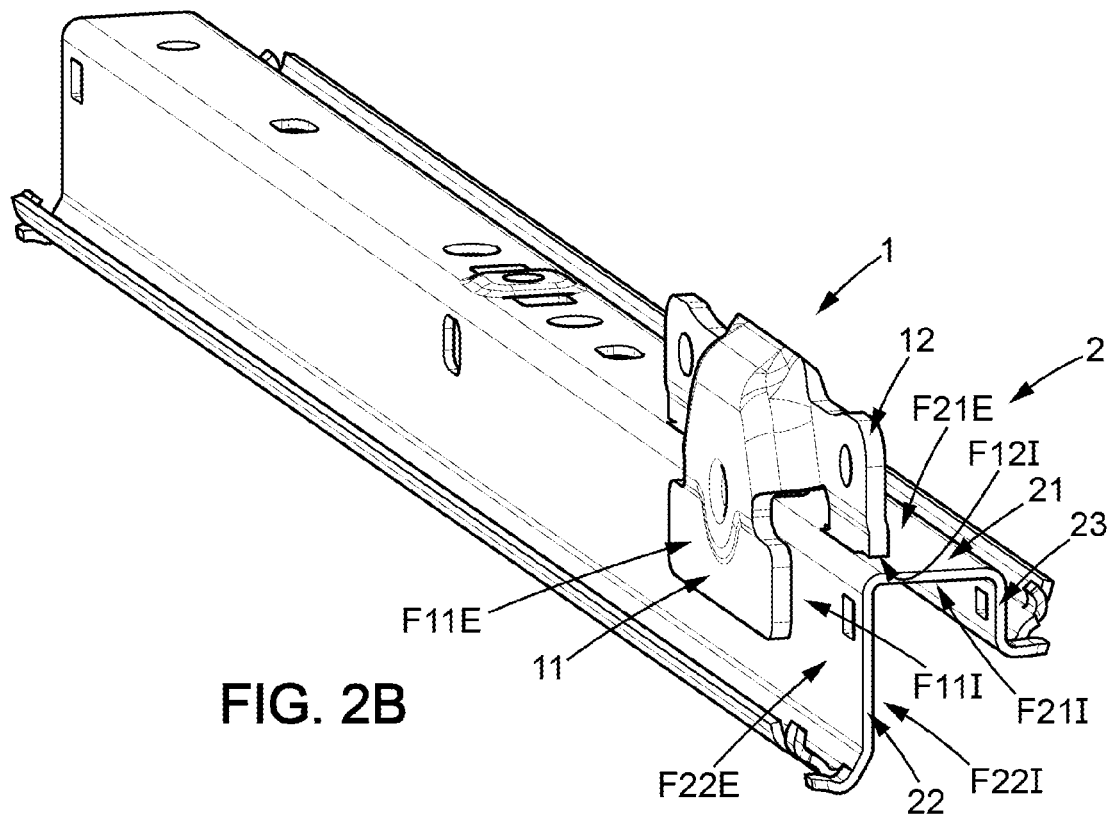
Figure 4:
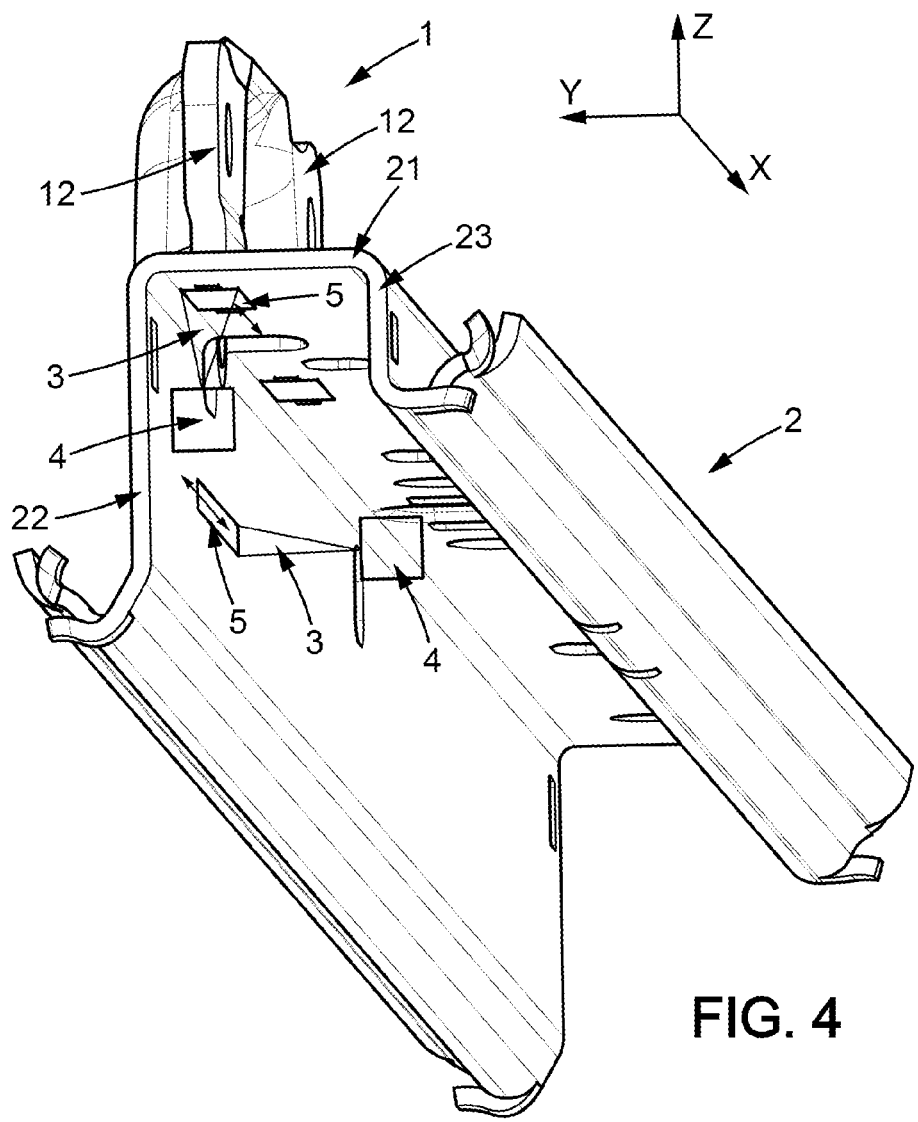

The various steps of the method according to the present disclosure are schematically represented in the embodiments of FIGS. 1A to 4:

step a) of providing an interface support 1 and a slide rail profile 2 is schematically represented in the embodiments of FIGS. 1A and 1B;

step b) of positioning the interface support 1 with the inner face F11I, F12I of its at least one wall 11, 12 against the outer face F21E, F22E of at least one wall 21, 22 of the profile 2 is schematically represented in the exemplary embodiment of FIGS. 2A and 2B;

step c) of creating a welding joint 5 between the wall 11, 12 of the interface support 1 and the wall 21, 22 of the profile 2 by moving the laser beam 3 is schematically represented in the exemplary embodiment of FIG. 4.

Figure 5A:
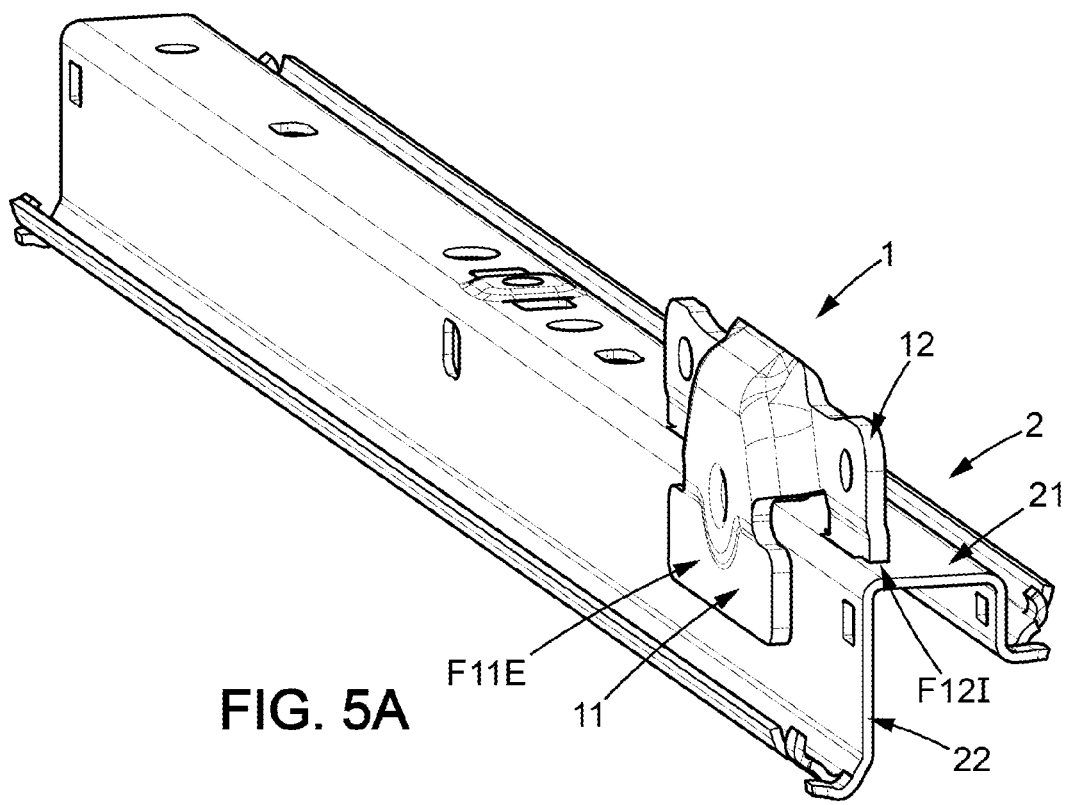
FIG. 5A shows a perspective view of a profile comprising an interface support fixed by welding, which can be obtained with a method according to one embodiment of the present disclosure.
Figure 5B:
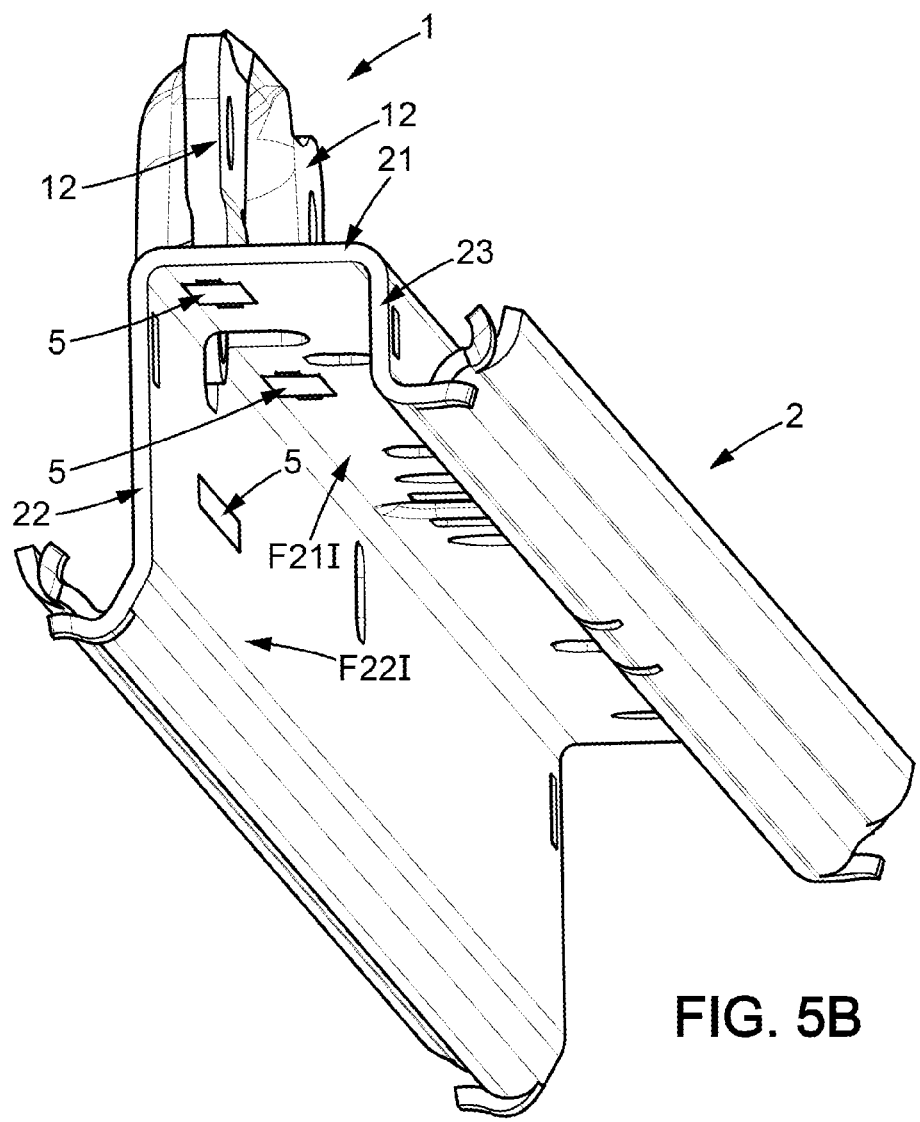
FIG. 5B shows a perspective view of the profile of FIG. 5A.

Thus, and as can be seen in the embodiments of FIGS. 5A and 5B which represent the profile 2 to which the interface support 1 is fixed at the end of implementing the method according to the present disclosure, the welding joint 5 created, which ensures the connection between the interface support 1 and the profile 2, only projects towards the inside of the U of the cross-section of the profile 2, from the inner face F21I, F22I of the wall 21, 22 of the profile 2.

As can be seen in the embodiments of FIGS. 1A and 1B, the wall 11, 12 of the interface support 1 has an inner face F11I, F12I, meaning it is intended to also be oriented towards the inside of the U of the cross-section of the profile 2, after the interface support 1 is fixed to the profile 2, and intended to rest against the outer face F22E of the wall 22 of the profile 2. Wall 11 may also have a outer face F11E, meaning it is intended to be oriented towards the outside of the U of the cross-section of the profile 2, after the interface support 1 is fixed to the profile 2, and intended to rest against the outer face F22E of the wall 22 of the profile 2.

The welding joint 5 created with the method according to the present disclosure extends essentially into the material of wall 21, 22 of the profile 2, between the inner face F21I, F22I and the outer face F21E, F22E of wall 21, 22, as well as partially into the material of wall 11, 12 of the interface support 1, projecting from the inner face F11I, F12I of wall 11, 12 but without extending outwards from wall 11, 12 of the interface support 1, and in particular without projecting from its outer face F11E.

On the contrary, and as can be seen in the exemplary embodiments of FIGS. 5A and 5B, this welding joint 5 protrudes from the inner face F11I, F12I of wall 11, 12 of the interface support 1, towards the inside of the U of the cross-section of the profile 2, and therefore also projecting towards the inside of the U of the cross-section of the profile 2 from the inner face F21I, F22I of wall 21, 22 of the profile 2.

Figure 6:
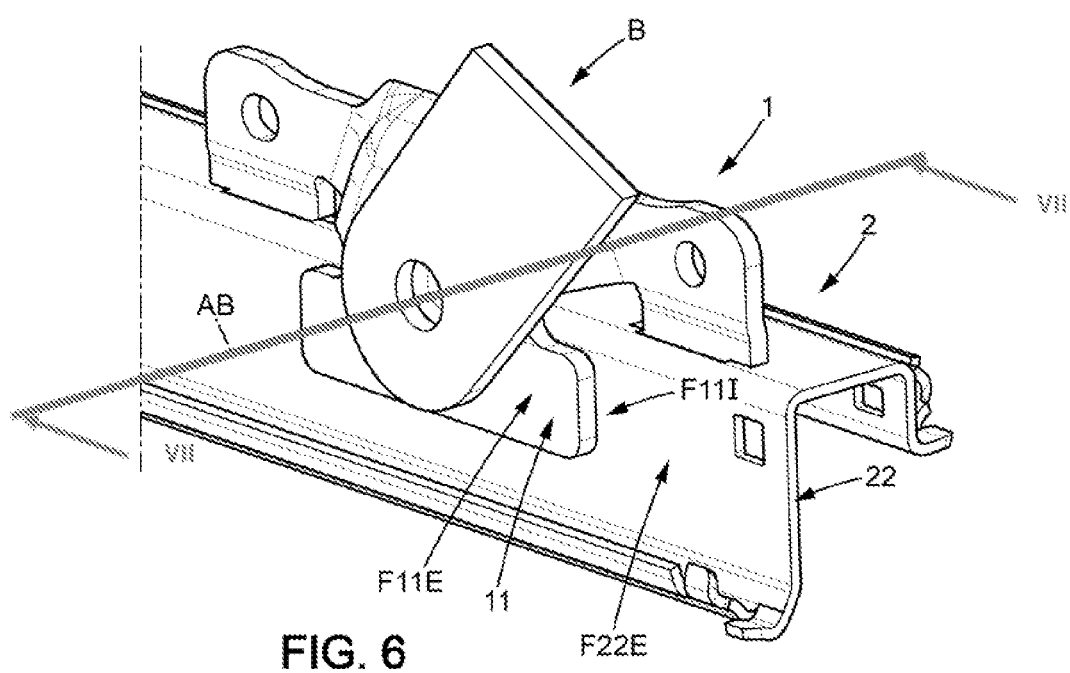
FIG. 6 shows a perspective view of the profile of FIG. 5A, with a connecting rod as the means of connecting a vehicle seat frame to the profile, the connecting rod being pivotally mounted on the interface support.

There is therefore no risk of the welding joint forming an obstacle to an element received on the interface support 1, for example resting against the outer face F11E of the wall 11 of the interface support 1, such as a connection means for connecting a vehicle seat frame to the profile, such as a connecting rod B as can be seen in the embodiment of FIG. 6.

Also, this welding joint 5 is not visible when the profile is in its position of use, meaning when the slide comprising it is installed on a vehicle floor and a seat is connected thereto, and as can be seen in the embodiments of FIG. 5A and FIG. 6, which improves the aesthetics of the profile and therefore of the slide thus obtained.

In contrast, a welding joint obtained with a comparative method of fixing by welding, as described below, protrudes from the outer face of the wall of the interface support towards the outside of the U of the cross-section of the profile, and therefore could form an obstacle for a received element resting on the outer face of the wall of the interface support.

Also, this welding joint obtained with a comparative method of fixing by welding will be visible when the profile is in its position of use, meaning when the slide comprising it is installed on a vehicle floor and a seat is fixed thereto.

This method can also be easily implemented in an automated manner by a suitable machine, and without using a robot.

The path of movement of the laser beam 3 relative to the wall 21, 22 of the profile 2 during step c) of the method according to the present disclosure, directly depends on the shape of the welding joint 5.

This movement of the laser beam 3 relative to the wall 21, 22 of the profile 2 during step c) of the method can thus for example comprise at least one translational movement of the laser beam 3 relative to the wall 21, 22 of the profile 2, for example in a longitudinal direction X of the profile 2 as can be seen in the embodiment of FIG. 4.

Additionally or alternatively, the movement of the laser beam 3 relative to the wall 21, 22 of the profile 2 during step c) of the method may comprise a translational movement in a transverse direction Y of the profile 2 and/or a translational movement in a vertical direction Z of the profile 2.

According to one embodiment, the thickness E11 of the wall of the interface support 1 is greater than the thickness E22 of the wall 22 of the profile 2, as can be seen for example in the embodiment of FIG. 1A.

With this arrangement of the present disclosure to produce the welding joint 5, as during step c), the laser beam 3 remains within the material of the wall 11, 12 of the interface support 1, without passing through it, simply passing through the wall 21, 22 of the profile 2 on either side, in other words from its inner face F21I, F22I to its outer face F21E, F22E, and as the thickness E11 of the wall of the interface support 1 is greater than the thickness E22 of the wall 22 of the profile 2, the power that needs to be supplied by the emitting source 4 of the laser beam 3 is lower than in the comparative methods in which the laser beam passes through the material of the wall of the interface support and part of the wall of the profile, and therefore a greater thickness of material.

The emitting source 4 of the laser beam 3 therefore uses a smaller amount of energy to weld the interface support 1 to the profile 2 in comparison to the comparative methods, which makes it possible to reduce the production cost of the method.

According to one embodiment, the method further comprises, following step b) and prior to step c), a step b') of positioning the laser beam 3 emitted from the emitting source 4, so that the latter successively passes, and in this order from the emitting source 4: the inner face F21I, F22I of the wall 21, 22 of the profile 2, then the outer face F21E, F22E of the wall 21, 22 of the profile 2, then the inner face F11I, F12I of the wall 11, 12 of the interface support 1, and while remaining within the material of the wall 11, 12 of the interface support 1.

Figure 3:
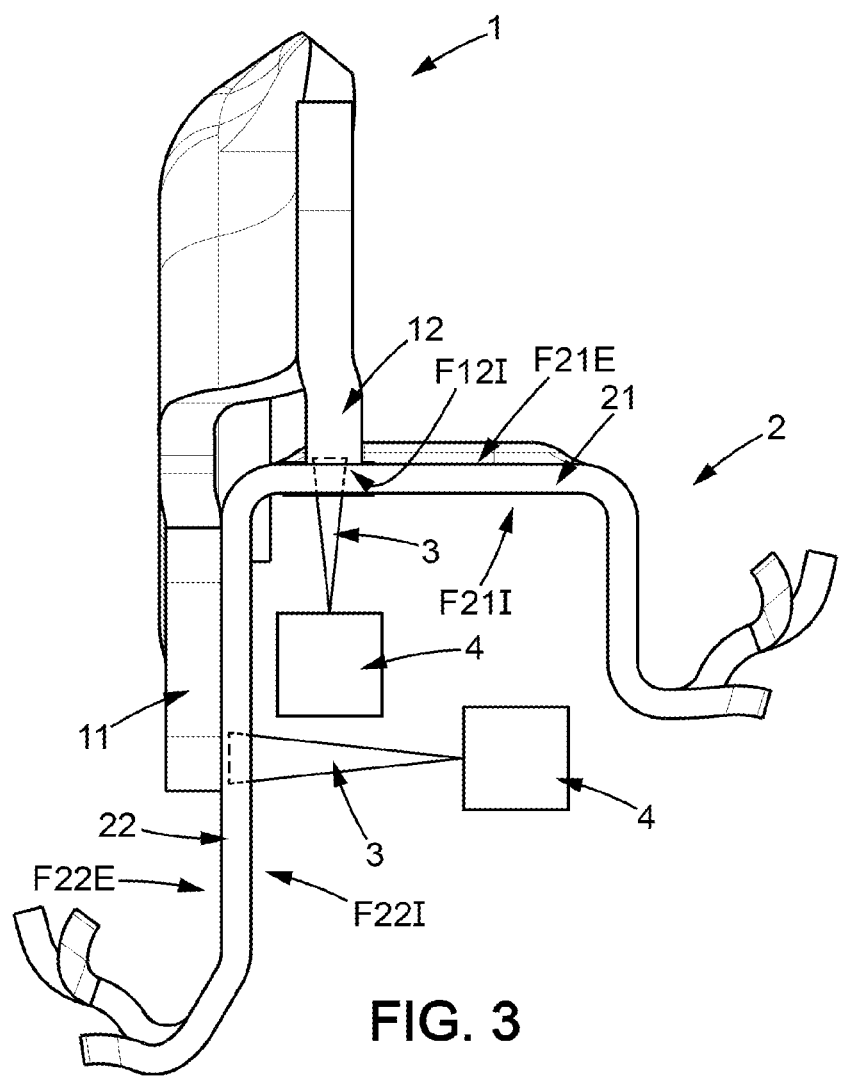

This step b') of the method, of positioning the laser beam 3 emitted from the emitting source 4, is schematically represented in the exemplary embodiment of FIG. 3.

Thus, and in the same manner as in step c) of the method according to the present disclosure, during step b'), the laser beam 3 remains within the material of the wall 11, 12 of the interface support 1, without passing through it, simply passing through the wall 21, 22 of the profile 2 on either side, in other words from its inner face F21I, F22I to its outer face F21E, F22E. The power supplied by the emitting source 4 of the laser beam 3 to implement the method according to the present disclosure and to create a welding joint 5 is therefore lower than in the comparative methods in which the laser beam passes through the material of the wall of the interface support and part of the wall of the profile, and therefore a greater thickness of material. This is particularly the case when the thickness E11 of the wall of the interface support 1 is greater than the thickness E22 of the wall 22 of the profile 2, as can be seen in the embodiment of FIG. 1A.

According to one embodiment, the profile 2 is an upper slide rail profile, and the interface support 1 has a first stop wall 11, the inner face F11I being provided to come into contact with the outer face F22E of a side wall 22 of the profile 2 during step (b) of the method, a welding joint 5 being created at the end of step d) between the first stop wall 11 of the interface support 1 and the side wall 22 of the profile 2.

According to one embodiment, the interface support 1 has a second stop wall 12, the inner face F12I of the second stop wall 12 being provided to come into contact with the outer face F21E of the transverse wall 21 of the profile 2 during step b) of the method, a welding joint 5 being created at the end of step d) between the second stop wall 12 of the interface support 1 and the transverse wall 21 of the profile 2.

As can be seen in the exemplary embodiment in FIGS. 4 and 5B, the welding joint 5 between the second stop wall 12 of the interface support 1 and the transverse wall 21 of the profile 2 protrudes from the inner face F12I of the second stop wall 12 of the interface support 1 towards the inside of the U of the cross-section of the profile 2, and also protrudes from the inner face F21I of the transverse wall 21 of the profile 2 towards the inside of the U of the cross-section of the profile 2.

Providing a fixing of the interface support 1 on the profile 2 via at least two welding joints 5, and on two walls 21, 22 of the profile 2, substantially perpendicular to each other, via the two stop walls 11, 12, makes it possible to ensure a stronger fixing of the interface support 1 on the profile 2.

As can be seen in the embodiments of FIGS. 4 and 5B, the interface support 1 may have two second stop walls 12, substantially identical and positioned in the extension of one another, each intended to be integrally secured via a separate or common welding joint 5, to the transverse wall 21 of the profile 2.

According to one embodiment, the interface support 1 is configured to receive a connection means B for connecting a vehicle seat frame to the profile 2.

Figure 7:
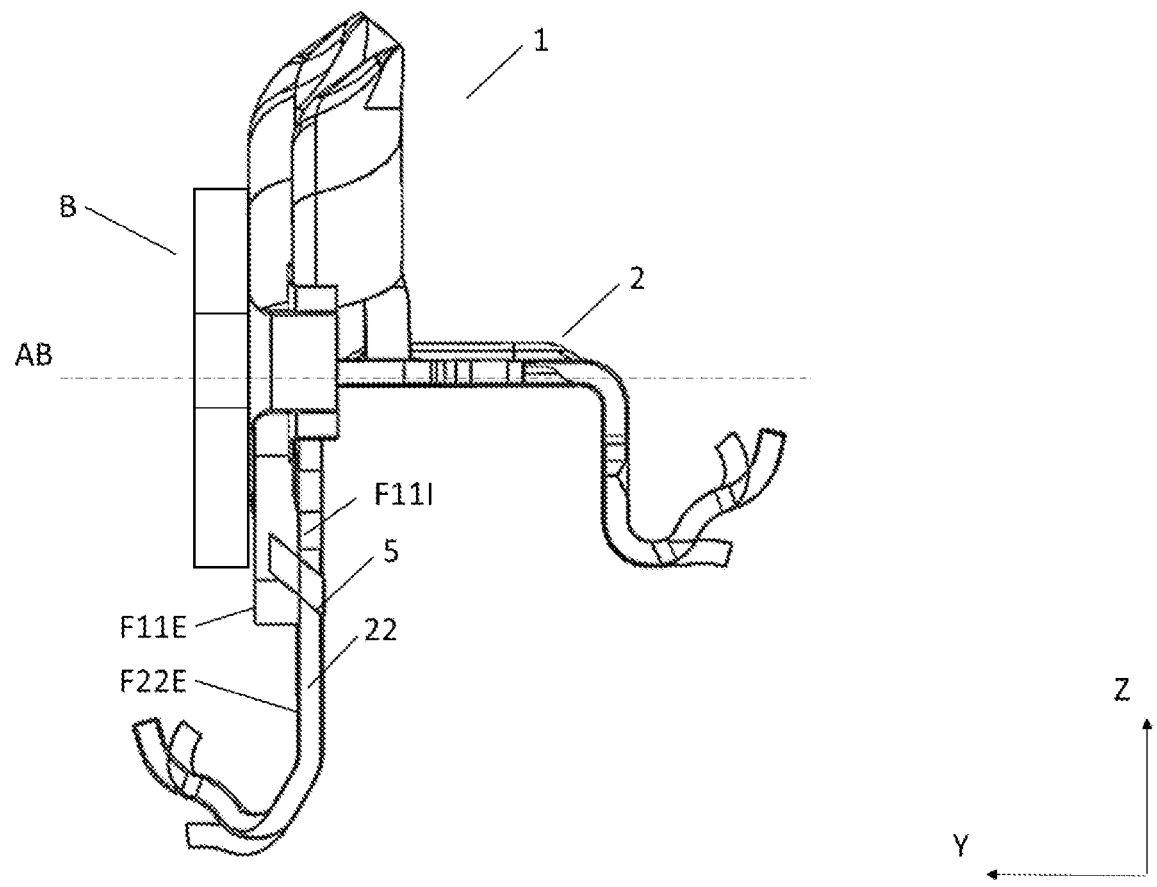
FIG. 7 shows a sectional view along line VII-VII of FIG. 6, of the profile of FIG. 6.

As can be seen in the embodiment of FIG. 7, the interface support 1 and the connection means B may advantageously be configured so that the connection means B is fixed on the interface support 1 in the extension of the outer face F11E of the first stop wall 11 of the interface support 1 in the transverse direction Y of the profile 2, and notably in abutment, in particular in planar contact, against the outer face F11E of the first stop wall 11 of the interface support 1. The welding joint 5 joining the first stop wall 11 of the interface support 1 to the side wall 22 of the profile 2 does not generate any extra thickness on the outer face F11E of the first stop wall 11, projecting outwardly from the outer face F11E, with no risk of hindering the movement of the connection means B relative to the interface support 1.

The connection means B can thus be provided to be fixed in the extension of the welding joint 5 joining the first stop wall 11 of the interface support 1 to the side wall 22 of the profile 2 in the transverse direction Y of the profile 2.

This makes it possible to reduce the footprint of the interface support 1, in particular in the longitudinal direction X of the profile 2, in that it is advantageously unnecessary to offset the connection means B relative to the welding joint 5 in the longitudinal direction X of the profile 2, and without adversely affecting the strength of the attachment of the interface support 1 to the profile 2.

As can be seen in the exemplary embodiment of FIG. 6, the connection means B may for example be a connecting rod B (partially shown in FIG. 6), hinged to the interface support 1 so as to pivot about an axis AB, and positioned in the extension of the outer face F11E of the first stop wall 11 of the interface support 1 in the transverse direction Y of the profile 2, and notably in abutment, in particular in planar contact, against the outer face F11E of the first stop wall 11 of the interface support. As the welding joint 5 joining the first stop wall 11 of the interface support 1 to the side wall 22 of the profile 2 does not generate any extra thickness on the outer face F11E of the first stop wall 11, projecting outwards from the exterior face F11E, there is no risk of hampering the pivoting movement of the connecting rod B around axis AB.

Advantageously, and as is more particularly visible in the embodiment of FIG. 7, the connecting rod B may be provided to be positioned, at least partially, in the extension of the welding joint 5 in the transverse direction Y of the profile 2, which makes it possible to reduce the footprint of the interface support 1, in particular in the longitudinal direction X of the profile 2, in that it is advantageously unnecessary to offset the connecting rod B, and in particular its pivot axis AB, relative to the welding joint 5 in the longitudinal direction X of the profile 2, and without adversely affecting the strength of the attachment of the interface support 1 to the profile 2.

The pivot axis AB of the connecting rod B for pivoting relative to the interface support 1 may be provided to extend substantially in the transverse direction Y of the profile 2.

According to one embodiment, the method further comprises a step d) of fixing, on the interface support 1, the connection means B for connecting a vehicle seat frame to the profile 2.

The connection means B may be fixed on the interface support 1 during d), in the extension of the outer face F11E of the first stop wall 11 in the transverse direction Y of the profile 2, and notably in abutment, in particular in planar contact, against the outer face F11E of the first stop wall 11 of the interface support 1.

According to one embodiment, the connection means B is fixed on the interface support 1 during d), in the extension of the welding joint 5 joining the first stop wall 11 of the interface support 1 to the side wall 22 of the profile 2 in the transverse direction Y of the profile 2.

According to one embodiment, the connection means B for connecting the seat frame to the profile 2 is a connecting rod B, hinged to the interface support 1 so as to pivot about an axis AB. The axis AB of the pivoting of the connecting rod B relative to the interface support 1 may extend substantially in the transverse direction Y of the profile 2.

The present disclosure also relates to a profile 2 of a vehicle seat slide, having a substantially U-shaped cross-section with a transverse wall 21 interconnecting two side walls 22, 23, the side walls 22, 23 being substantially parallel to each other and the transverse wall 21 being substantially perpendicular to the side walls 22, 23, the transverse wall 21 and each side wall 22, 23 having an inner face F21I, F22I and an outer face F21E, F22E, the slide profile 2 comprising an interface support 1 fixed by welding on the outer face F21E, F22E of one of its walls 22.

According to the present disclosure, the profile 2 is capable of being obtained by the method according to one of the embodiments described above.

All of the arrangements described above concerning the profile 2 provided with an interface support 1 fixed by at least one welding joint 5 obtained with the method as described above, apply to the profile 2 according to the present disclosure.

The present disclosure relates to the field of vehicle seats and in particular motor vehicle seats. In particular, the present disclosure relates to the field of manufacturing vehicle seats, in particular slides provided to ensure the fixing of the seat to the vehicle floor, as well as to guide it in translation relative to the vehicle floor.

A slide for a vehicle seat has an upper rail and a lower rail mounted to slide relative to one another in a longitudinal direction. The lower rail is generally intended to be fixed to the floor of a vehicle, while the upper rail is intended to be connected to the seat frame.

The upper rail and lower rail are generally each composed of a metal profile cut and folded according to the desired configuration, the profile of the upper rail, called the upper profile, being configured to be received and to slide in the profile of the lower rail, called the lower profile, or vice versa.

A connection means, for example such as a connecting rod, may be provided to connect the vehicle seat frame to the upper rail of the slide, the connection means being integrally secured to the upper profile, generally by means of an interface support fixed to the upper profile.

Such an interface support, generally implemented in the form of a metal sheet cut and folded according to the desired configuration, is intended to be permanently fixed to the upper profile, and in particular by welding, the upper profile also being generally made, at least partially, of metal.

Fixing by welding has the advantage of being simple and quick to perform, and in particular in a fully automated manner, for example by a robot, and allows a strong fixing of the interface support to the upper profile, able in particular to withstand a collision of the vehicle.

The welding is generally carried out with a laser beam emitted by an emitting source which is positioned so as to come into contact with the area to be welded, which corresponds to an interface area between the interface support and the upper profile, in order to heat it so that the metal of each part is melted, which upon cooling will create a welding joint between the two parts.

A slide profile generally has a substantially U-shaped cross-section with a transverse wall interconnecting two side walls, the side walls being substantially parallel to each other and the transverse wall being substantially perpendicular to the side walls. Advantageously, the transverse wall connects the side walls by one of their respective ends.

The interface support is generally intended to be fixed to a profile on the outer face of one of its side walls. Each side wall indeed has an outer face, meaning oriented towards the outside of the U formed by the cross-section of the profile, and an inner face, meaning oriented towards the inside of the U formed by the cross-section of the profile.

In the comparative methods of fixing, by welding, an interface support on a profile of a vehicle seat slide, after positioning the interface support to have the inner face of one of its walls against the outer face of the side wall of the profile in the desired position, the laser beam is positioned so that it successively passes through, in this order from the emitting source: the wall of the interface support, then the outer face of the side wall of the profile, and while remaining within the material of the side wall of the profile.

The comparative welding joint is then produced by moving the laser beam relative to the wall of the interface support along the weld area, the laser beam maintaining a position such that it successively passes through, in this order from the emitting source: the wall of the interface support, then the outer face of the side wall of the profile, and while remaining within the material of the side wall of the profile.

However, the comparative welding joint thus created between the interface support and the upper profile of the slide creates an extra thickness on the outer face of the wall of the interface support, which, first of all, gives an unsightly appearance to the slide profile thus obtained, because the welding joint is visible when the slide comprising the upper profile is in its position of use, fixed to the floor of the vehicle and with a seat connected thereto.

This extra thickness on the outer face of the wall of the interface support can also form an obstacle hindering the mobility of a part intended to be mounted on the interface support, resting against the outer face of the wall of the interface support, for example a connection means, for example such as a connecting rod, provided to connect the vehicle seat frame to the upper rail of the slide.

Grinding and/or polishing this extra thickness in order to eliminate it increases the manufacturing time and therefore the production cost of the slide rail profile, and can also weaken the weld and therefore the attachment of the interface support to the upper profile of the slide, which then may no longer be able to withstand an impact of the vehicle.

Also, the thickness of the wall of the interface support, resting against the outer face of the wall of the profile's side wall, is generally greater than the thickness of the profile's side wall. Therefore, as the laser beam has to pass through the entire thickness of the wall of the interface support in order to reach the interior of the material of the profile's side wall, the power to be supplied by the emitting source to provide such a laser beam is particularly high and consumes a significant amount of energy, which also increases the production cost of the slide rail profile.

Finally, due to the geometry of the upper slide profile, in order to carry out this welding operation automatically, it is performed by means of a robot which represents a high cost, in particular because of the complexity of implementing the robot.

The present disclosure overcomes these disadvantages of the comparative methods of fixing, by welding, an interface support on a profile of a vehicle seat slide, by proposing a method of fixing, by welding, an interface support on a profile of a vehicle seat slide without impeding the mobility of an element mounted on the interface support.

Another object of the present disclosure is to provide such a method of fixing by welding that ensures a strong attachment of the interface support to the slide profile, and in particular in the event of an impact undergone by the vehicle receiving the slide.

Another object of the present disclosure is to provide such a method of fixing by welding which allows improving the aesthetics of the slide profile obtained.

Another object of the present disclosure is to provide such a method of fixing by welding which is simple to perform, and in particular in a fully automated and simplified manner, without using a robot, that is fast and at a reduced production cost.

A method of fixing, by welding, an interface support to a profile of a vehicle seat slide rail is proposed, comprising the steps of:

a) providing an interface support having at least one wall with an inner face, and providing a slide rail profile having a substantially U-shaped cross-section with a transverse wall interconnecting two side walls, the side walls being substantially parallel to each other and the transverse wall being substantially perpendicular to the side walls, the transverse wall and each side wall having an inner face and an outer face, b) positioning the interface support with the inner face of its at least one wall against the outer face of a wall of the profile, c) creating a welding joint between the wall of the interface support and the wall of the profile by moving a laser beam, emitted from an emitting source, relative to the wall of the profile, while keeping the laser beam in a position such that it successively passes through, and in this order from the emitting source: the inner face of the wall of the profile, then the outer face of the wall of the profile, then the inner face of the wall of the interface support, and while remaining within the material of the wall of the interface support.

According to optional features of the present disclosure, taken alone or in combination:

the thickness of the wall of the interface support is greater than the thickness of the wall of the profile;

the profile is an upper slide rail profile, and the interface support has a first stop wall, the inner face of the first stop wall being provided to come into contact with the outer face of a side wall of the profile during step b) of the method, a welding joint being created at the end of step d) between the first stop wall of the interface support and the side wall of the profile;

the interface support has a second stop wall, the inner face of the second stop wall being provided to come into contact with the outer face of the transverse wall of the profile during step b) of the method, a welding joint being created at the end of step c) between the second stop wall of the interface support and the transverse wall of the profile;

the method further comprises, following step b) and prior to step c), a step b') of positioning the laser beam emitted from the emitting source so that it passes successively through, and in this order from the emitting source: the inner face of the wall of the profile, then the outer face of the wall of the profile, then the inner face of the wall of the interface support, and while remaining within the material of the wall of the interface support, the interface support is configured to receive a connection means for connecting a vehicle seat frame to the profile.

The present disclosure also relates to a profile of a vehicle seat slide, having a substantially U-shaped cross-section with a transverse wall interconnecting two side walls, the side walls being substantially parallel to each other and the transverse wall being substantially perpendicular to the side walls, the transverse wall and each side wall having an inner face and an outer face, the slide profile comprising an interface support fixed by welding to the outer face of one of its walls, the profile being capable of being obtained by the method according to one of the embodiments of the present disclosure.

The following numbered clauses include embodiments that are contemplated and non-limiting:

Clause 1. A method of fixing, by welding, an interface support (1) on a profile (2) of a vehicle seat slide rail, comprising the steps of:

a) providing an interface support (1) having at least one wall (11, 12) with an inner face (F11I, F12I), and providing a slide rail profile (2) having a substantially U-shaped cross-section with a transverse wall (21) interconnecting two side walls (22, 23), the side walls (22, 23) being substantially parallel to each other and the transverse wall (21) being substantially perpendicular to the side walls (22, 23), the transverse wall (21) and each side wall (22, 23) having an inner face (F21I, F22I) and an outer face (F21E, F22E), b) positioning the interface support (1) with the inner face (F11I, F12I) of its at least one wall (11, 12) against the outer face (F21E, F22E) of a wall (21, 22) of the profile (2), c) creating a welding joint (5) between the wall (11, 12) of the interface support (1) and the wall (21, 22) of the profile (2) by moving a laser beam (3), emitted from an emitting source (4), relative to the wall (21, 22) of the profile (2), while keeping the laser beam (3) in a position such that it passes successively through, and in this order from the emitting source (4): the inner face (F21I, F22I) of the wall (21, 22) of the profile (2), then the outer face (F21E, F22E) of the wall (21, 22) of the profile (2), then the inner face (F11I, F12I) of the wall (11, 12) of the interface support (1), and while remaining within the material of the wall (11, 12) of the interface support (1).

Clause 2. The method according to clause 1, wherein the thickness (E11) of the wall of the interface support (1) is greater than the thickness (E22) of the wall (22) of the profile (2).

Clause 3. The method according to clause 1 or 2, wherein the profile (2) is an upper slide rail profile, and the interface support (1) has a first stop wall (11), the inner face (F11I) of the first stop wall (11) being provided to come into contact with the outer face (F22E) of a side wall (22) of the profile (2) during step b) of the method, a welding joint (5) being created at the end of step c) between the first stop wall (11) of the interface support (1) and the side wall (22) of the profile (2).

Clause 4. The method according to clause 3, wherein the interface support (1) has a second stop wall (12), the inner face (F12I) of the second stop wall (12) being provided to come into contact with the outer face (F21E) of the transverse wall (21) of the profile during step b) of the method, a welding joint (5) being created at the end of step c) between the second stop wall (12) of the interface support (1) and the transverse wall (21) of the profile (2).

Clause 5. The method according to one of clauses 1 to 4, wherein the method further comprises, following step b) and prior to step c), a step b') of positioning the laser beam (3) emitted from the emitting source (4) so that it passes successively through, and in this order from the emitting source (4): the inner face (F21I, F22I) of the wall (21, 22) of the profile (2), then the outer face (F21E, F22E) of the wall (21, 22) of the profile (2), then the inner face (F11I, F12I) of the wall (11, 12) of the interface support (1), and while remaining within the material of the wall (11) of the interface support (1).

Clause 6. The method according to one of clauses 1 to 5, wherein the interface support (1) is configured to receive a connection means (B) for connecting a vehicle seat frame to the profile (2).

Clause 7. The method according to clause 6, further comprising a step d) of fixing, on the interface support (1), the connection means (B) for connecting a vehicle seat frame to the profile (2).

Clause 8. The method according to clause 7, taken in combination with claim 3, alone or in combination with claim 4, wherein the connection means (B) is fixed on the interface support (1) during d), in the extension of the outer face (F11E) of the first stop wall (11) in the transverse direction (Y) of the profile (2), and notably in abutment, in particular in planar contact, against the outer face (F11E) of the first stop wall (11) of the interface support (1).

Clause 9. The method according to clause 8, wherein the connection means (B) is fixed on the interface support (1) during d), in the extension of the welding joint (5) joining the first stop wall (11) of the interface support (1) to the side wall (22) of the profile (2) in the transverse direction (Y) of the profile (2).

Clause 10. The method according to one of clauses 6 to 9, wherein the connection means (B) for connecting the seat frame to the profile (2) is a connecting rod (B), hinged to the interface support (1) so as to pivot about an axis (AB).

Clause 11. A profile (2) of a vehicle seat slide, having a substantially U-shaped cross-section with a transverse wall (21) interconnecting two side walls (22, 23), the side walls (22, 23) being substantially parallel to each other and the transverse wall (21) being substantially perpendicular to the side walls (22, 23), the transverse wall (21) and each side wall (22, 23) having an inner face (F22I) and an outer face (F22E), the slide profile (2) comprising an interface support (1) fixed by welding on the outer face (F21E, F22E) of one of its walls (21, 22), the profile (2) being capable of being obtained by the method according to one of clauses 1 to 10.

The invention claimed is:

1. A method of fixing, by welding, an interface support on a profile of a vehicle seat slide rail, the method comprising the steps of:
providing an interface support having at least one wall with an inner face, and providing a slide rail profile having a substantially U-shaped cross-section with a transverse wall interconnecting two side walls, the side walls being substantially parallel to each other and the transverse wall being substantially perpendicular to the side walls, the transverse wall and each side wall having an inner face and an outer face,
positioning the interface support with the inner face of its at least one wall against the outer face of a wall of the profile,
creating a welding joint between the wall of the interface support and the wall of the profile by moving a laser beam, emitted from an emitting source, relative to the wall of the profile, while keeping the laser beam in a position such that it passes successively through, and in this order from the emitting source: the inner face of the wall of the profile, then the outer face of the wall of the profile, then the inner face of the wall of the interface support, and while the laser beam remains within the wall of the interface support.

2. The method of claim 1, wherein a thickness of the wall of the interface support is greater than a thickness of the wall of the profile.

3. The method of claim 1, wherein the profile is an upper slide rail profile, and the interface support has a first stop wall, an inner face of the first stop wall being provided to come into contact with the outer face of a side wall of the profile during positioning step, a welding joint being created at an end of creating step between the first stop wall of the interface support and the side wall of the profile.

4. The method of claim 3, wherein the interface support has a second stop wall, an inner face of the second stop wall being provided to come into contact with the outer face of the transverse wall of the profile during positioning step, a welding joint being created at the end of creating step between the second stop wall of the interface support and the transverse wall of the profile.

5. The method of claim 1, wherein the method further comprises, following the positioning step and prior to creating step, another step of positioning the laser beam emitted from the emitting source so that it passes successively through, and in this order from the emitting source: the inner face of the wall of the profile, then the outer face of the wall of the profile, then the inner face of the wall of the interface support, and while the laser beam remains within the wall of the interface support.

6. The method of claim 1, wherein the interface support is configured to receive a connection means for connecting a vehicle seat frame to the profile.

7. The method of claim 6, further comprising a step of fixing, on the interface support, the connection means for connecting a vehicle seat frame to the profile.

8. The method of claim 7, wherein the profile is an upper slide rail profile, and the interface support has a first stop wall, an inner face of the first stop wall being provided to come into contact with the outer face of a side wall of the profile during positioning step, a welding joint being created at an end of creating step between the first stop wall of the interface support and the side wall of the profile.

9. The method of claim 8, wherein the connection means is fixed on the interface support during the fixing step, in an extension of an outer face of the first stop wall in the transverse direction of the profile, and notably in abutment, in particular in planar contact, against the outer face of the first stop wall of the interface support.

10. The method of claim 9, wherein the connection means is fixed on the interface support during the fixing step, in an extension of the welding joint joining the first stop wall of the interface support to the side wall of the profile in the transverse direction of the profile.

11. The method claim 6, wherein the connection means for connecting the seat frame to the profile is a connecting rod, hinged to the interface support so as to pivot about an axis.

12. A profile of a vehicle seat slide, having a substantially U-shaped cross-section with a transverse wall interconnecting two side walls, the side walls being substantially parallel to each other and the transverse wall being substantially perpendicular to the side walls, the transverse wall and each side wall having an inner face and an outer face, the slide profile comprising an interface support fixed by welding on the outer face of one of its walls, the profile being capable of being obtained by the method of claim 1.

13. The method of claim 1, wherein the laser beam remains within the wall of the interface support without passing all the way through the wall of the interface support.

\* \* \* \* \*